US011613147B2

(12) United States Patent
Van Ginderen et al.

(10) Patent No.: US 11,613,147 B2
(45) Date of Patent: Mar. 28, 2023

(54) VEHICLE WHEEL, IN PARTICULAR A BICYCLE WHEEL, HUB FOR SUCH A WHEEL AND VEHICLE FITTED WITH SUCH A WHEEL

(71) Applicant: Hubtech Holding B.V. [NL/NL], Eindhoven (NL)

(72) Inventors: Gertjan Van Ginderen, Eindhoven (NL); Eugéne Antoine Adriaan Herben, Nuenen (NL)

(73) Assignee: HUBTECH HOLDING B.V., Eindhoven (NL)

( * ) Notice: Subject to any disclaimer, the term of this patent is extended or adjusted under 35 U.S.C. 154(b) by 404 days.

(21) Appl. No.: 16/472,404

(22) PCT Filed: Dec. 19, 2017

(86) PCT No.: PCT/NL2017/050854
§ 371 (c)(1),
(2) Date: Jun. 21, 2019

(87) PCT Pub. No.: WO2018/117828
PCT Pub. Date: Jun. 28, 2018

(65) Prior Publication Data
US 2019/0359016 A1    Nov. 28, 2019

(30) Foreign Application Priority Data

Dec. 23, 2016   (NL) ...................................... 2018061
Aug. 30, 2017   (NL) ...................................... 2019466

(51) Int. Cl.
*B60C 23/12*     (2006.01)
*B60B 27/00*     (2006.01)
(Continued)

(52) U.S. Cl.
CPC ........ *B60C 23/127* (2020.05); *B60B 27/0047* (2013.01); *B60C 23/126* (2020.05);
(Continued)

(58) Field of Classification Search
CPC ... B60C 23/12; B60C 23/127; B60B 27/0047; F04B 27/04; F04B 37/10; F16H 1/28;
(Continued)

(56) References Cited

U.S. PATENT DOCUMENTS 6,082,708 A *  7/2000  Mullican ................... B66F 3/35
                                                                    254/93 HP
7,237,590 B2 *  7/2007  Loewe .................. B60C 23/004
                                                                    152/418
(Continued)

FOREIGN PATENT DOCUMENTS

CN       204641284 U     9/2015
EP       0 621 144 A1   10/1994
(Continued)

OTHER PUBLICATIONS

International Search Report for International Application No. PCT/NL2017/050854 dated Mar. 15, 2018.

*Primary Examiner* — Jason R Bellinger
*Assistant Examiner* — Emily G. Castonguay
(74) *Attorney, Agent, or Firm* — Suiter Swantz pc llo

(57) ABSTRACT

The present invention relates to a vehicle wheel comprising a hub, a rim and an inflatable tyre, in which the hub is situated around a rotation axle of the wheel, a compressor which is situated substantially inside the hub for compressing outside air, provided with an inlet for taking in air at atmospheric pressure and an outlet for delivering air at an increased pressure; a drive for driving the compressor, in which the drive is movable with respect to the rotation axle, in particular rotatable, more particularly rotatable in a direc-
(Continued)

tion opposite to that of the hub; an air reservoir for storing the air at increased pressure, in which the air reservoir is situated inside the rim of the wheel; a connection for connecting the outlet of the compressor to the air reservoir of the inflatable tyre of the wheel.

16 Claims, 15 Drawing Sheets

(51) Int. Cl.
*F04B 27/04* (2006.01)
*F04B 37/10* (2006.01)
*F16H 1/28* (2006.01)
*F16D 13/22* (2006.01)

(52) U.S. Cl.
CPC ............ *B60C 23/137* (2020.05); *F04B 27/04* (2013.01); *F04B 37/10* (2013.01); *F16D 13/22* (2013.01); *F16H 1/28* (2013.01)

(58) Field of Classification Search
CPC .......... F16D 13/22; F16D 13/38; F16D 13/40; F16D 25/00; F16D 25/06; F16D 25/062; F16D 25/063; F16D 25/0635; F16D 27/00; F16D 27/14
See application file for complete search history.

(56) References Cited

U.S. PATENT DOCUMENTS

| 7,581,576 | B2 * | 9/2009 | Nakano | ................... B60C 23/12 |
| | | | | 152/419 |
| 2004/0194845 | A1 | 10/2004 | Du Toit | |
| 2016/0263949 | A1 | 9/2016 | Miu et al. | |
| 2017/0320542 | A1 * | 11/2017 | Sebhatu | ................ F03C 1/0607 |

FOREIGN PATENT DOCUMENTS

| JP | 2004-136797 | A | | 5/2004 | |
| JP | 2006007790 | A | * | 1/2006 | ............ B60C 23/12 |
| WO | 2015/114153 | A1 | | 8/2015 | |

* cited by examiner

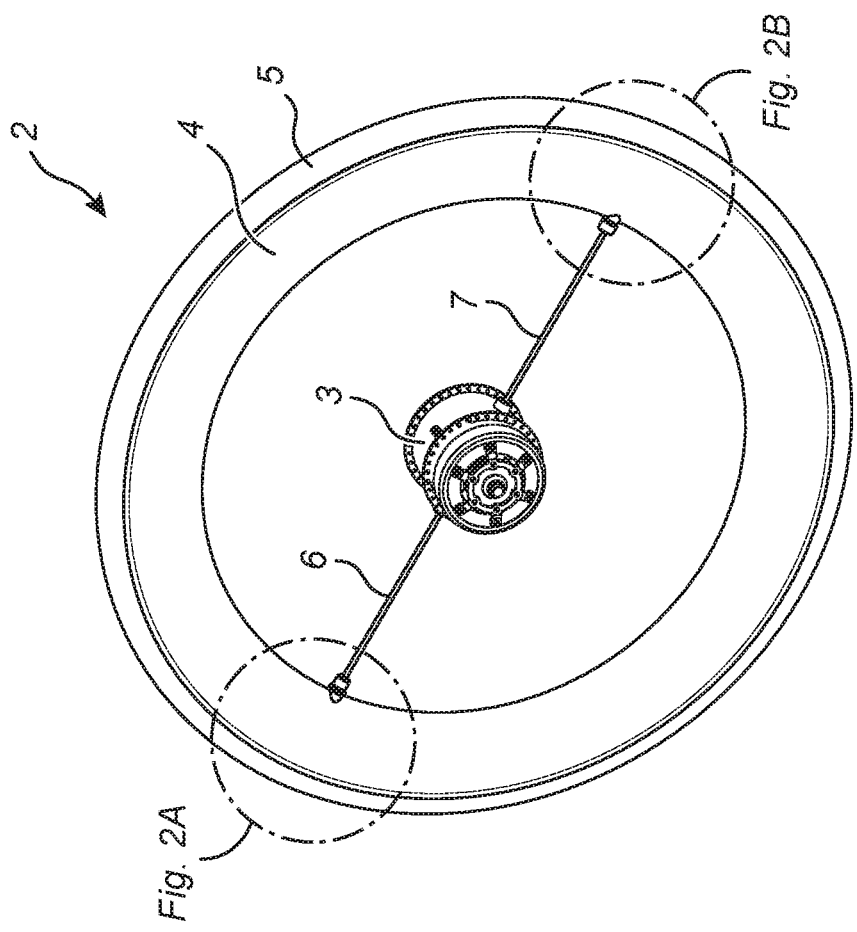
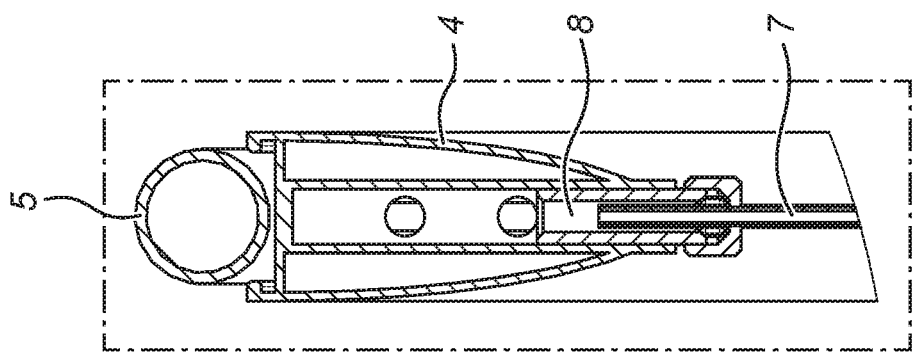
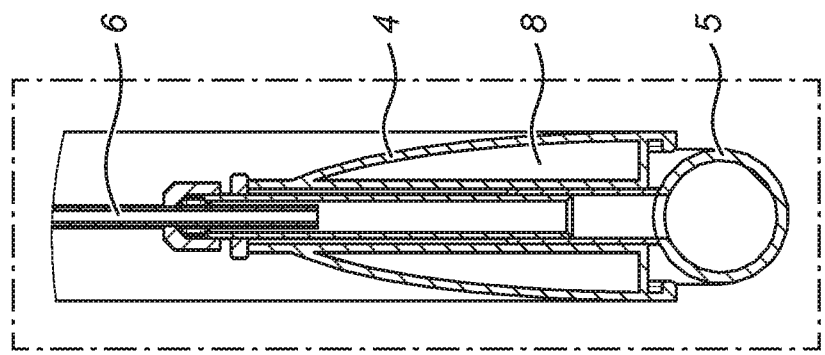

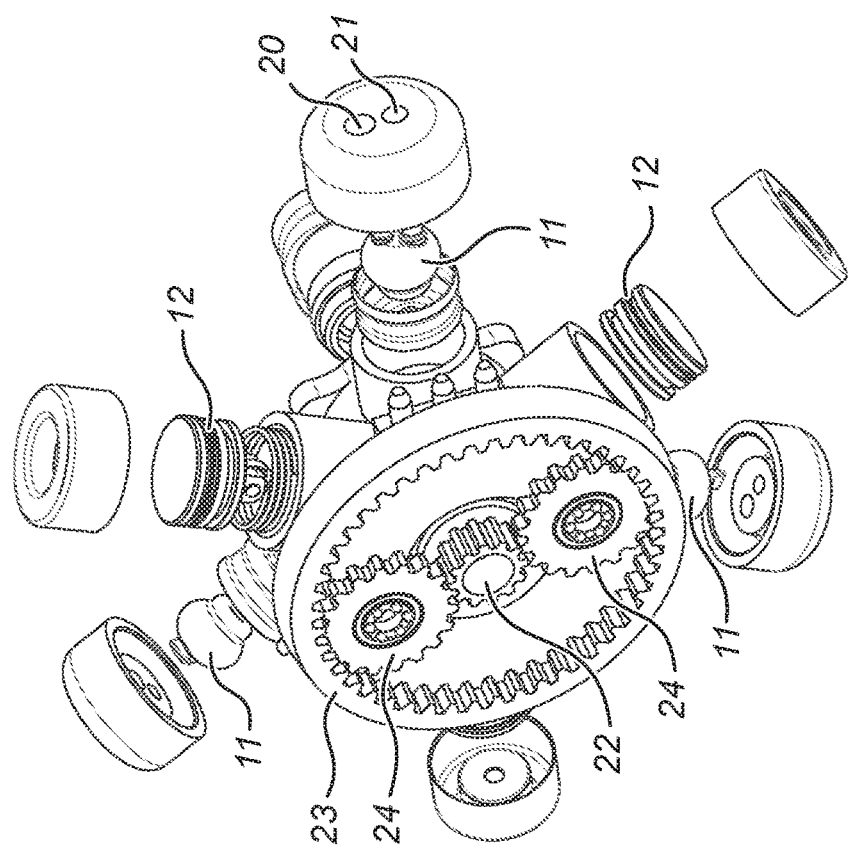
Fig. 6B
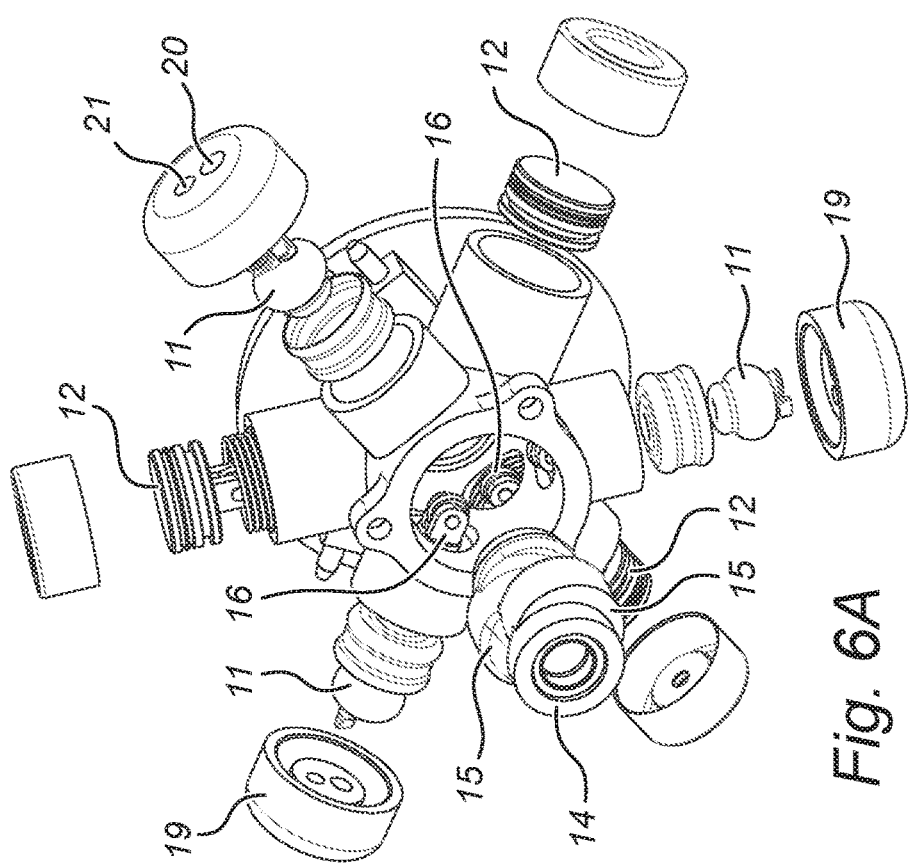
Fig. 6A
Fig. 6

VEHICLE WHEEL, IN PARTICULAR A BICYCLE WHEEL, HUB FOR SUCH A WHEEL AND VEHICLE FITTED WITH SUCH A WHEEL

BACKGROUND

The present invention relates to a vehicle wheel, in particular a bicycle wheel, hub for such a wheel and vehicle fitted with such a wheel.

Wheel hubs are generally known and usually form part of an axle hub connection, for example of a bicycle. In this case, the axle of the bicycle is usually mounted in the hub, which hub is connected to the rim of a bicycle wheel by means of spokes. The wheel, including its hub, rotates about and is mounted on the axle of the bicycle.

During, for example, cycling competitions, it is important to ride at a predetermined tyre pressure, in which case this pressure may depend on the terrain over which the cyclists ride. Less pressure in the tyres usually results in a larger contact area between the tyre and the terrain, which results in better grip than is obtained by means of a higher pressure. On the contrary, higher pressure with less grip results in less resistance and thus greater speed. In order to be able to adjust the tyre pressure to the circumstances during, for example, a competition or cycling trip, a cyclist has to get off and either release air from the tyres or pump air into the tyres, which is associated with a considerable amount of time and effort. It is also necessary to take a separate bicycle pump along when cycling in order to be able to inflate the tyre.

WO2015114153 for instance discloses a wheel hub assembly of a bicycle wheel comprising a wheel axle, a rotary pump comprising a pump housing, a pump rotor, a first fluid port configured for fluidly coupling to a pneumatic tire and a second fluid port configured for fluidly coupling to a fluid reservoir. The assembly further comprises control means for controlling actuation or a mode/state of operation. The pump is configured for displacing fluid between the first and second fluid ports. The pump rotor is configured for rotating relative to the pump housing coaxially with the wheel axle, and the pump housing is configured for rotating relative to the wheel axle. US2016263949 discloses a tire inflation apparatuses is provided for maintaining a predetermined inflation pressure of a pair of tires mounted a dual wheel unit of a vehicle. The apparatus includes a first and a second pump unit that are connected to a housing that includes a mounting structure for engaging a complementary mounting structure of the dual wheel unit. The first and second pump include first and second pump rods configured to translate in response to rotation of the dual wheel unit. A gear set and an eccentric drive mechanism are arranged to reciprocate the first and second pump rods. EP0621144 discloses a vehicle wheel on which an air-inflatable tire is mounted, comprising an air reservoir and a pump unit for selectively causing air to flow from the tire into the reservoir for deflating the tire and for causing air to flow from the reservoir into the tire for inflating the tire.

BRIEF SUMMARY

It is therefore an object of the present invention to provide an air pressure-regulating system which can be used while cycling and/or locomotion, or when stationary, in which the air pressure can be increased or decreased to arbitrary values. Vehicles which can be provided with such systems according to the invention include all sorts of (possibly electric) bicycles, scooters, mopeds, motorbikes and other two-wheelers (or three-wheelers) wherein locomotion occurs by rolling over at least one of the wheels of the vehicle. Additionally, the system may be applied to other motorized vehicles such as automobiles.

To this end, the present invention comprises a vehicle wheel, in particular a bicycle wheel, comprising a hub, a rim and an inflatable tyre, in which the hub is situated around a rotation axle of the wheel, which hub rotates about the stationary rotation axle upon rotation of the wheel; a compressor which is substantially situated inside the hub for compressing outside air, provided with an inlet for taking in air at atmospheric pressure, and an outlet for delivering air at an increased pressure; a drive for driving the compressor, in which the drive is movable with respect to the rotation axle, in particular rotatable, more particularly rotatable in a direction opposite to that of the hub; and a first connection for connecting the outlet of the compressor to the inflatable tyre of the wheel.

The present invention thus uses energy from a rotating (bicycle) wheel to drive a compressor by means of which it then becomes possible to inflate a tyre during locomotion or biking. The first connection, connecting the outlet of the compressor to the inflatable tyre of the wheel may comprise various branches and intermediate components, such as an air reservoir, between the tyre and the compressor.

The compressor, which is situated in the hub, compresses outside air on account of the rotation of the drive about the rotation axle. While it is moving, such as during cycling, the compressor can thus be driven to compress outside air. This compressed air can be supplied to the tyre of the wheel to be inflated, for example if the pressure in this tyre is lower than desired. In order to supply the air compressed by the compressor to the inflatable tyre, a connection is provided between the compressor and the tyre.

The drive for driving the compressor, which is movable with respect to the rotation axle, in particular rotatable, may also be (rigidly) connected to the hub, to rotate together with the hub upon movement. The drive may be directly connected to a stator axle of the hub. Such configuration may be particular suitable when the system is used in motorized vehicles, and does result in a simplified system, although it also results in a reduced rotational difference and thus a reduces compressing action. In this configuration no gears or transmission is required, and the drive may be directly connected to the axle. In such cases, the rpm of the compressor equals the rpm of the vehicle wheel.

The wheel may also include an air reservoir for storing the air at increased pressure, in which the air reservoir is situated inside the rim of the wheel; a first connection for connecting the outlet of the compressor to the air reservoir of the inflatable tyre of the wheel; and a second connection for connecting the air reservoir and the inflatable tyre of the wheel Due to the presence of the air reservoir, it is possible to be able to inflate the tyre in a short time during a ride as well as when stationary. For an improved performance of the system, it is advantageous to be able to change the tyre pressure in a very short time and, in addition, for the driving of a compressor to require only very little energy, preferably spread over a relatively long period, instead of a lot of required energy in a short period. If, during a cycling competition, there is a change in, for example, terrain, it is advantageous if the tyre pressure can be adjusted immediately without requiring any additional energy from the cyclist at that point in time. If additional energy were to be required at this point in time in order to be able to adjust the tyre pressure, this would initially result in a drawback for the cyclist instead of an advantage, since it requires a great deal of energy to adjust the tyre pressure and it does not take place immediately, as the work therefor still has to be performed at the point in time of activation.

The compressed air can also be stored in an air reservoir, for example if the pressure in the tyre has a desired pressure. This air store is situated inside the rim of the wheel, as a result of which no additional store or tanks on the wheel are required and thus the weight of the wheel will not increase either. In order to supply the compressed air from the reservoir to the inflatable tyre, a connection is provided between the reservoir and the tyre. Preferably, the air compressed by the compressor is always supplied to the air reservoir, and the tyre is always inflated using air from the air reservoir. However, when omitting an air reservoir, compressed air can be fed directly to the tyre.

The compressor is for example connected to the hub, in particular in a fixed and/or non-rotating manner. A movement or rotation of the hub about the rotation axle thus simultaneously causes a rotation of the compressor about the rotation axle. This is particularly advantageous if the drive of the compressor is also rotatable about the rotation axle, but in the opposite direction. Thus, an increased mutual speed of rotation can be achieved, resulting in a higher compressor output.

The wheel comprises, for example, a controller for controlling the air supply and connecting the first connection to either the air reservoir or the inflatable tyre. Such a controller comprises, for example, a pneumatic valve, such as a two-way or three-way valve. By means of such valves, the internal elements can be coupled as desired. The controller is configured, for example, such that compressed air is passed to the inflatable tyre via a first duct and/or is passed to the air reservoir via a second duct. If the compressed air cannot enter one of these ducts, no compression is desired and the compressor can be switched off.

The first and/or second connection comprises, for example, a hollow spoke. The connections couple the air reservoir and the tyre, which reservoir and tyre are situated on the rim side of the wheel, while the compressor is situated in the hub. The connection between the air reservoir and tyre runs, for example, via the first and/or second connection and via the hub. Usually, spokes extend between these parts of a wheel. By providing the connections in a hollow spoke, the appearance of the wheel is only affected very slightly and the construction of the wheel does not have to be changed unnecessarily. It is, for example, also possible for the first and second connections to be arranged coaxially. As a result thereof, the same spoke could be used for both connections, in which case for example the inner side may be used for the first connection and the space between the inner side of the first connection and the inner side of the spoke may be used for the second connection.

The hub is provided with an air intake for supplying air to the inlet of the compressor, the air intake preferably being provided with a labyrinth and for example a filter in order to prevent the ingress of dirt and water in the hub. The compressor which is situated inside the hub is thus provided with outside air (to be compressed) via the air supply of the hub. The labyrinth ensures that no dust, mud and moisture are supplied to the compressor (or at least to a lesser degree) in order to prevent soiling of the compressor. The air intake is, for example, also configured as an air discharge, in which case, for example, the labyrinth is cleaned by blowing during the discharge of air. Supplying air via the intake exerts a sucking effect, at least with regard to, for example, dirt, with dirt accumulating on or in the labyrinth. When air is blown off by the compressor and this blowing off takes place via the same intake, any dirt which may have accumulated is thus blown out of or away from the labyrinth. As the expelled air has a higher air pressure than the surroundings, any dirt can easily be blown away, thus cleaning the labyrinth and the air intake. Dirt may also be expelled due to rotation of the hub, which rotation creates a centrifugal effect.

The compressor is configured, for example, to compress air in at least two separate steps, in which the compressor is configured, for example, to compress air to a pressure in the air reservoir of up to 6 bar in a first step, in particular to approximately 4 bar, and to compress the compressed air further in a subsequent second step to a pressure of up to 18 bar, in particular of approximately 12 bar. Compressing the air in several steps causes less loss of energy in these steps. The compressor is configured, for example, to compress air in at least two separate steps, in a first step to 4 to 6 times atmospheric pressure and in a second step to 3 times the first pressure. Such pressure may for instance be used in road bikes. In other type of bicycles or motorized vehicles the pressures may be considerable lower. In such cases the compressor may be configured, for example, to compress air in at least two separate steps, in which the compressor is configured, for example, to compress air to a pressure in the air reservoir of up to 3 bar in a first step, in particular to approximately 2 bar, and to compress the compressed air further in a subsequent second step to a pressure of up to 9 bar, in particular of approximately 6 bar.

Compressing the air usually proceeds isentropically, without an exchange of energy with the surroundings, and compression proceeds quickly. Such a compression results in heating of the air and subsequent compression thus requires more work. The increase in work associated with compression depends on the ratio between the starting volume and the final volume of the compression stroke, and also on a coefficient, according to the following formula:

$$1 - \left(\frac{V_1}{V_2}\right)^{k-1}$$

In this formula, $V_1$ is the starting volume of the compression and $V_2$ the final volume of the compression. With an isentropic compression, the coefficient k equals 1.4, and with a (slower) isothermic compression it equals 1.0. Thus, there is no increase in work in the case of an isothermic compression. Since the increase in work thus depends on the relative (starting and final) volumes, it is advantageous to limit the difference (ratio) of these volumes per compression stroke.

The compressor comprises, for example, a store for storing air compressed in a first step at a first increased pressure, with the store preferably being situated inside the hub. In the second step, air from the store is, for example, subsequently compressed further to the desired or increased final pressure. In an embodiment, the store may be formed of a connective tubing, connecting the two pump stages.

The compressor comprises, for example, at least two pistons or bellows for compressing air, in which each piston or bellows is provided, for example, with a non-return valve, which valve allows air to be supplied, but prevents compressed air from leaking. The compressor is, for example, a displacement pump. In this case, the pistons or bellows are configured for admitting pressure at a first pressure, for example atmospheric pressure, via a line or opening with a non-return valve. This prevents air which is compressed in the compressor from escaping to the outside air again. The bellows are, for example, (glass fibre-)reinforced bellows, so that they withstand increased pressures, in particular in the second or subsequent step. The reinforcement of the bellows comprises, for example, glass fibre, silk, Nomex, Dyneema or Kevlar. Alternatively, membranes or diaphragms can be used to compress the air, which membranes of diaphragms are possibly provided with an air inlet valve (or inlet check valve) and an air outlet valve (or outlet check valve). Also other compression mechanisms may be applied for compressing the air upon compressing movement of the compressor.

The compressor comprises, for example, several cylinders which are rigidly connected to the hub and several pistons which are configured to move in the cylinders in a radial direction with respect to the rotation axle. The pistons move in a reciprocating manner in the cylinders, for example on account of the rotation of the drive of the compressor. The cylinders are distributed, for example, proportionally at equal distance from each other along a(-n imaginary) circumference of the hub or equidistant around the rotation axle. The cylinders may also be distributed over several shells, in which each shell comprises at least two cylinders distributed at equal distances from each other over the circumference of the hub, in which the shells are situated substantially parallel to each other. Each shell extends substantially in the radial direction at a different position of the rotation axle. In this way, several cylinders and pistons in the same hub can be driven by the same drive, in which the drive of each shell can be adjusted with respect to other shells, for example by a camshaft on the drive. Each piston is provided, for example, with a cam follower and the drive is provided, for example, with a cam system to which the cam followers are coupled. During rotation, the cams of the cam system execute, for example, an eccentric circle with respect to the rotation axle and thus the piston connected to the cam follower executes a translational, reciprocating, movement inside the cylinder.

The compressor is, for example, of a displacement type or a piston pump. The advantage of such types of compressors is that these have a high build-up of pressure and are self-priming. In addition, the maximum build-up of pressure is substantially independent of speed, in contrast with, for example, a centrifugal pump or a vane pump.

The drive comprises, for example, a camshaft which is rotatable about the rotation axle for converting the rotation of the drive into a reciprocating or pumping movement, in particular at right angles to the rotation axle or in a radial direction. The camshaft is provided, for example, with a central axle having several projections, in which the projections are offset with respect to each other in a radial direction. Each projection can thus be used to create a movement in a radial direction at various locations on the central axle and thus, for example, control the different compression steps of the compressor by means of the same rotating movement of the drive.

The compressor and the drive are provided, for example, with teeth which are connected by means of a planetary gear clutch, in which the teeth of the planetary clutch and the teeth of the compressor have a ratio, for example, greater than 1. Such a ratio provides an acceleration of the compressing or pumping movement. Such an acceleration then ensures that smaller compressor parts can be used to achieve the same compression. In this case, the compressor comprises, for example, the satellite wheel of the planet wheel mechanism, and the drive the planet wheel carrier with a central axle, which are connected to each other by at least two planet wheels. A planetary gear clutch or planet wheel mechanism has the advantage that, depending on the fixing of the various elements with respect to each other, various functions can be fulfilled. If, for example, none of the parts of the clutch are fixed, all elements rotate together at the same angular speed. This results in there being no mutual difference between the drive and the compressor and thus the compressor is not driven. If the planet wheels are fixed with respect to the other elements, the satellite wheel and the carrier rotate in the opposite direction and the mutual difference in speed is greatest.

The drive of the compressor is, for example in a disengaged position, rotatable about the stationary rotation axle together with the hub, in particular at substantially the same angular speed, with the drive of the compressor rotating with respect to the hub in an engaged position, in particular in the opposite direction. In this case, a disengaged position of the drive for example corresponds to a planet wheel configuration in which none of the parts are fixed with respect to each other. During rotation of the wheel, and thus rotation of the hub and the compressor, the drive of the compressor co-rotates at the same angular speed and the compressor is thus not driven. The disengaged position of the drive is thus a free position where no compression takes place.

The hub comprises, for example, a clutch disc, which disc, in the disengaged position, rotates about the rotation axle together with the hub, and which disc, in the engaged position, is connected to the rotation axle, which axle is stationary with respect to the hub. In the engaged position, the clutch disc is thus fixed. When the planetary gears are on the clutch disc, such a connection (or fixation) leads to a rotation of the drive in the opposite direction compared to that of the satellite wheel which is usually situated on the compressor.

Engaging the clutch of the clutch disc is effected, for example, by means of an electromechanical actuator or a hydraulic or pneumatic drive, or a combination thereof. An advantage of a hydraulic drive or actuation of the clutch disc is that existing hydraulic systems of, for example, bicycles or cars can be used for this purpose. An advantage of an electromechanical actuator is that it can be actuated remotely and/or in an automated manner. A pneumatic drive may for instance be powered with air compressed by the compressor itself, which could be very efficient. Such drive may comprise an internal pressure reservoir, for storing air for powering the pneumatic drive and/or a pressure control unit.

The wheel also comprises, for example, a clutch mechanism for changing the position of the clutch disc, in particular in reaction to an external signal, such as a braking action or an actuating signal from an actuating unit. Compressing outside air in the compressor of the wheel requires energy, which energy is more preferably used for travelling and speed, for example during a cycling competition. However, brakes usually generate energy, typically generating heat in brake pads. If this energy is (also) used to drive the compressor, this will result in energy gains in time. The clutch mechanism is configured, for example, to fix the clutch disc or to connect it to the rotation axle when a braking action is intended (for example by depressing a brake pedal or squeezing a brake lever). The clutch mechanism may also be configured to move a clutch disc with pressurized air in response to an external signal.

The clutch mechanism comprises, for example, a lifting magnet. By energizing such a magnet, a force is optionally exerted on the clutch disc, making it possible to change the position of the clutch disc and to switch on the compressor, for example.

The wheel according to the present invention can be actuated, for example, by means of a control system. This control system is situated, for example, on a computer, such as a cycle computer, or on a mobile telephone, such as a smartphone. Cycle computers usually use Bluetooth or an ANT+ protocol. In order to be able to communicate by means of such systems, the hub is for example provided with a chip for wireless communication and with a power source, such as a battery or accumulator, for energizing the chip. The hub thus comprises for example a voltage source, such as a battery or an accumulator. The voltage source is preferably situated in a sealed waterproof space or chamber of the hub. The hub may also be provided with a voltage meter, in contact with the voltage source, for determining the voltage of the voltage source. The voltage source is preferably rechargeable, for example by means of rotation of the hub or by means of a dynamo or via a micro-USB connection. The voltage source may be configured for energizing various electronic components in the hub. The voltage source has a voltage of, for example, 3, 6, 9 or 12 Volts. If desired, the position of the energy source may be transmitted to the control system, with the control system comprising, for example, an indicator for indicating the state of the energy source.

The hub also comprises, for example, at least one pressure sensor, for determining the pressure in the inflatable tyre, in the air reservoir, in the compressor and/or the internal store of the compressor. By means of the sensors, the pressure state in the wheel can be determined and on the basis of the determined pressures, it is possible, for example, to decide to supply compressed air to the tyre, to release air from the tyre or to change nothing. The hub may also comprise a speed sensor for determining the speed of rotation of the hub. In addition, the hub may be provided with an inclination sensor or rotation sensor for registering if the drive of the compressor is active. This makes it possible to determine if the compressor is active and on the basis thereof, a signal may be transmitted. The wheel itself may also comprise a pressure sensor.

The hub thus comprises, for example, a control system, which system is configured, for example, to switch on the compressor if the air pressure in the air reservoir drops below a predetermined value or wherein the control unit is configured to switch on the compressor on the basis of an external signal, such as the user of the vehicle pressing a button.

It is possible, for example, to switch on the compressor or to achieve a rotation with respect to each other between the compressor and the drive, in particular an opposite rotation, on the basis of a braking action or on the basis of external actuation, for example on the basis of a signal emitted by the control system. This makes it possible to use braking energy to compress air as well as to compress air during normal travel of the wheel.

The hub is also provided, for example, with a coupling piece, such as a valve, on the outer side of the hub. This coupling piece is configured, for example, to be connected to an external pressure source, such as a bicycle pump or an air compressor, for inflating the tyre and/or filling the air reservoir with air at a predetermined pressure. Pressurizing the air reservoir beforehand reduces the compression required during rotation of the wheel and thus the required work, in particular during cycling. This coupling piece is configured, for example, to allow the reservoir to empty. For example, when the hub is used in competitions, such as cycling competitions, it is conceivable that every competitor has to start with an empty reservoir in order to thus give every cyclist the same chances of winning.

The present invention also relates to a hub or a compressor, evidently for use in a wheel according to the present invention, and to a vehicle, in particular a bicycle, provided with at least one wheel according the present invention.

BRIEF DESCRIPTION OF THE DRAWINGS

The invention will be explained by means of the non-limiting exemplary embodiments which are illustrated in the following figures, in which:

FIG. 2 diagrammatically shows a wheel according to the present invention with two connections;

Figure 3A:
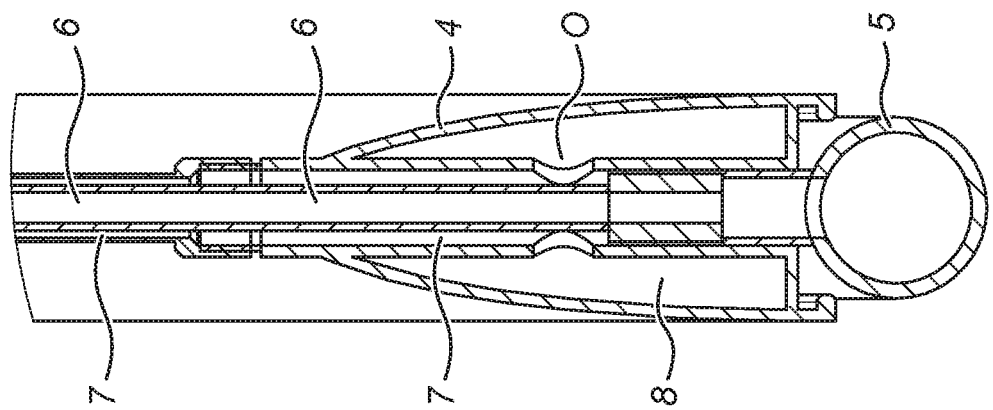
Figure 3:
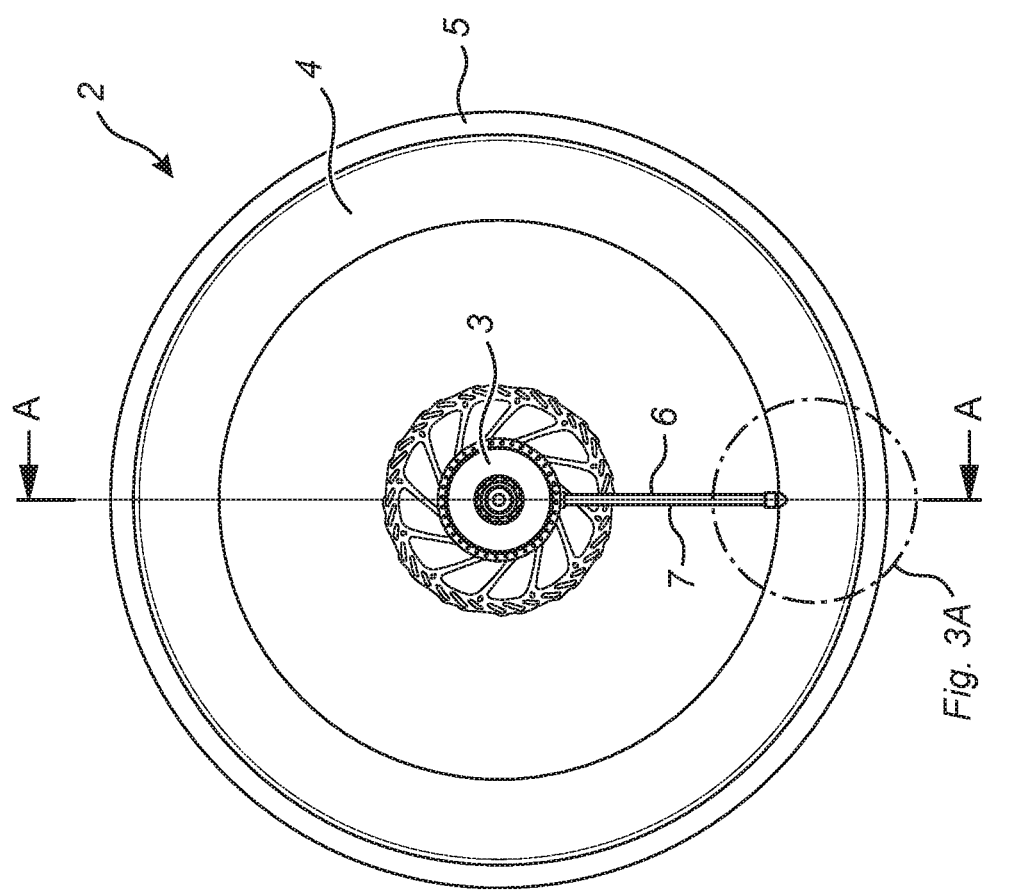
Figure 4:
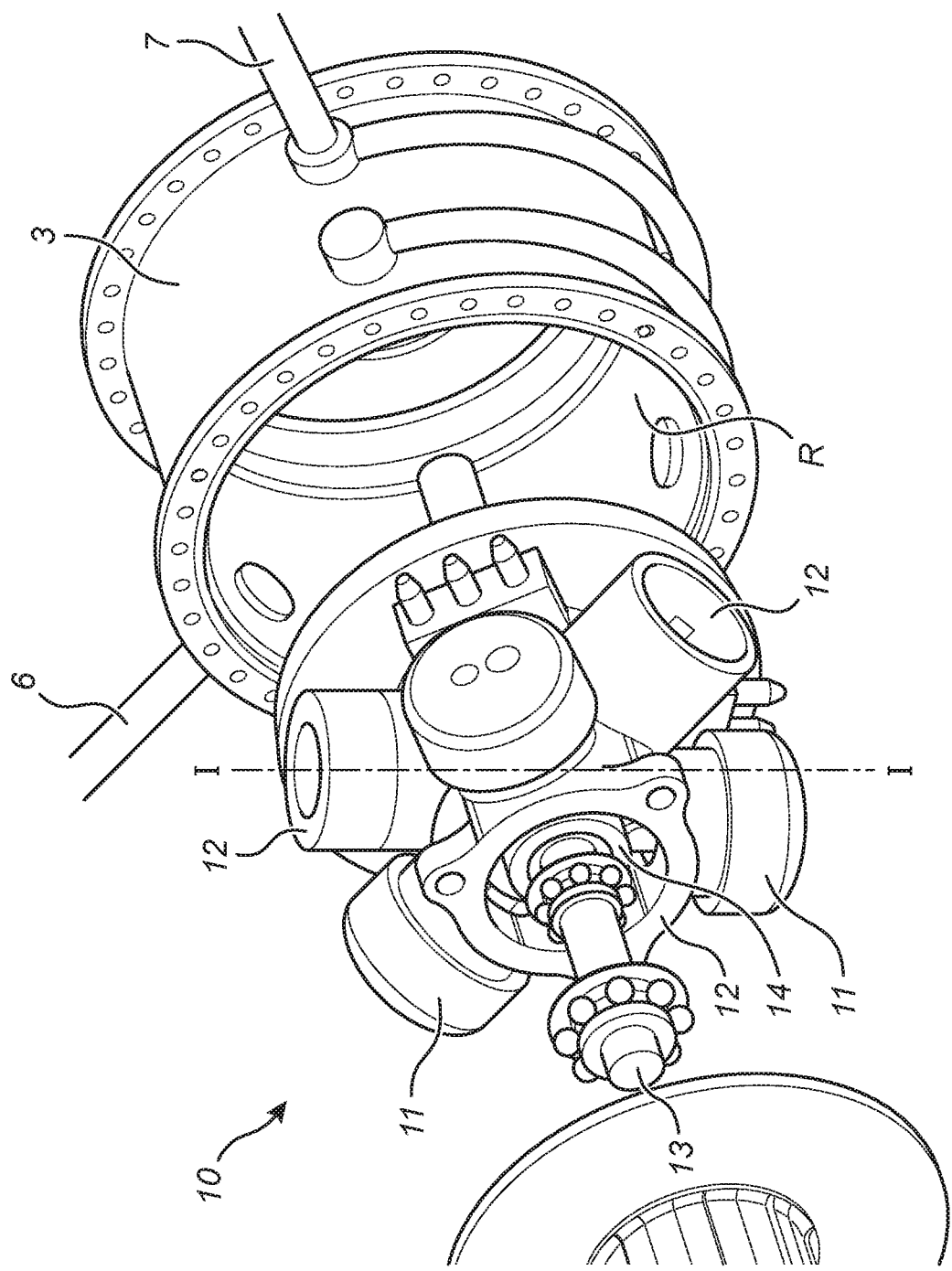
Figure 5:
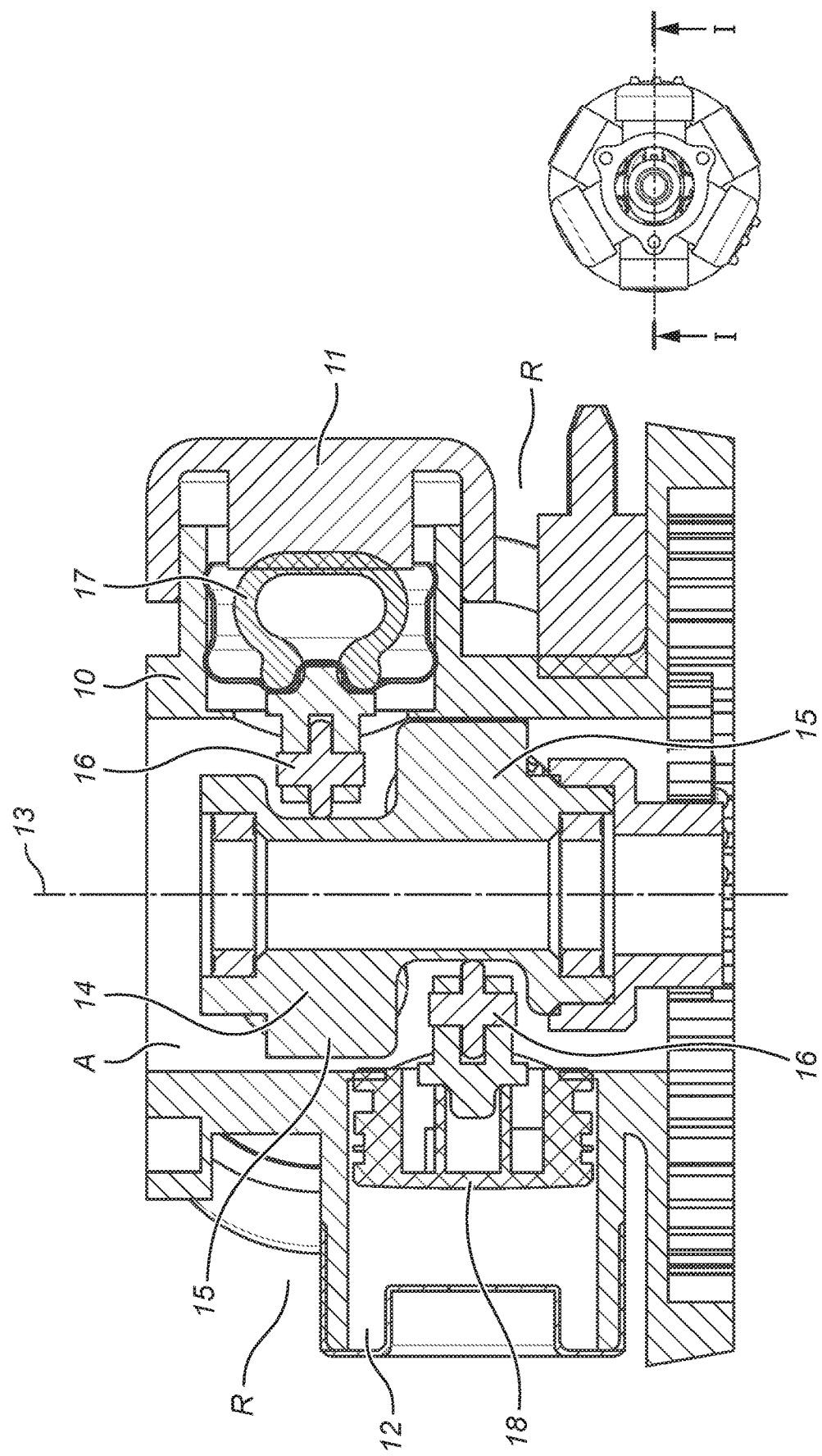
Figure 7:
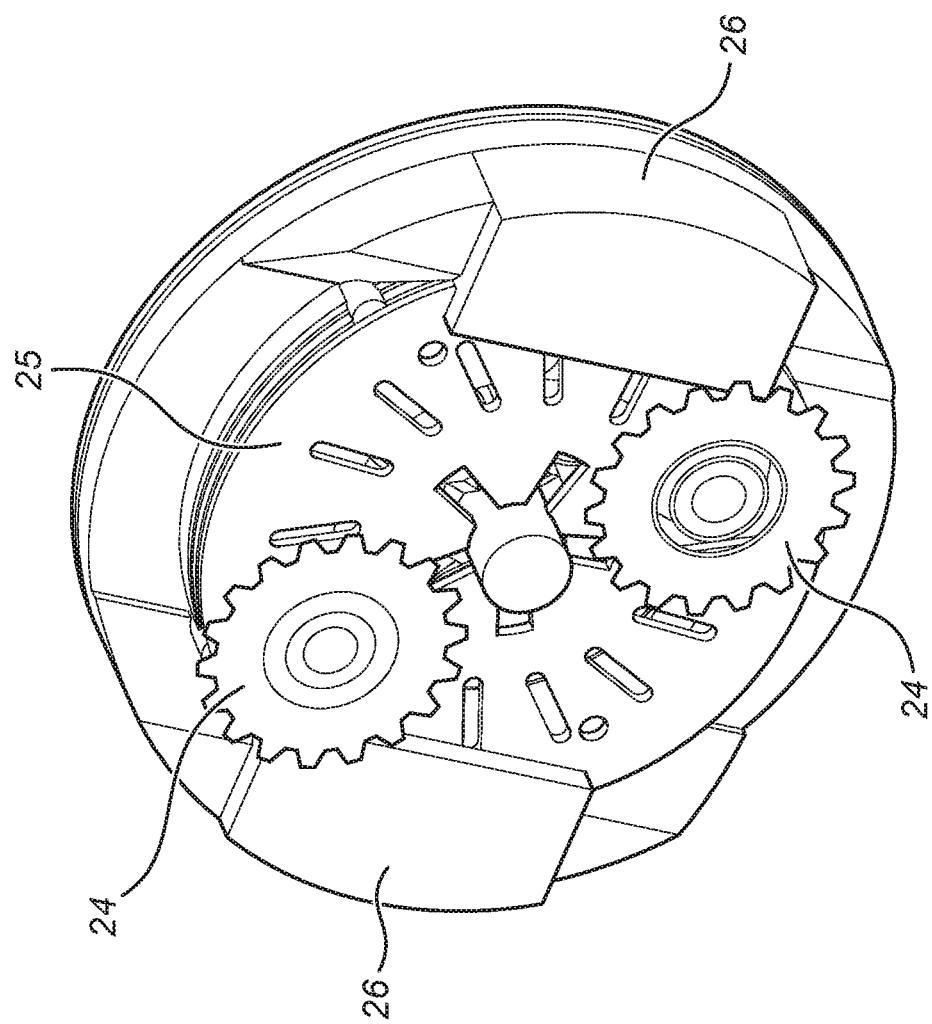
Figure 8:
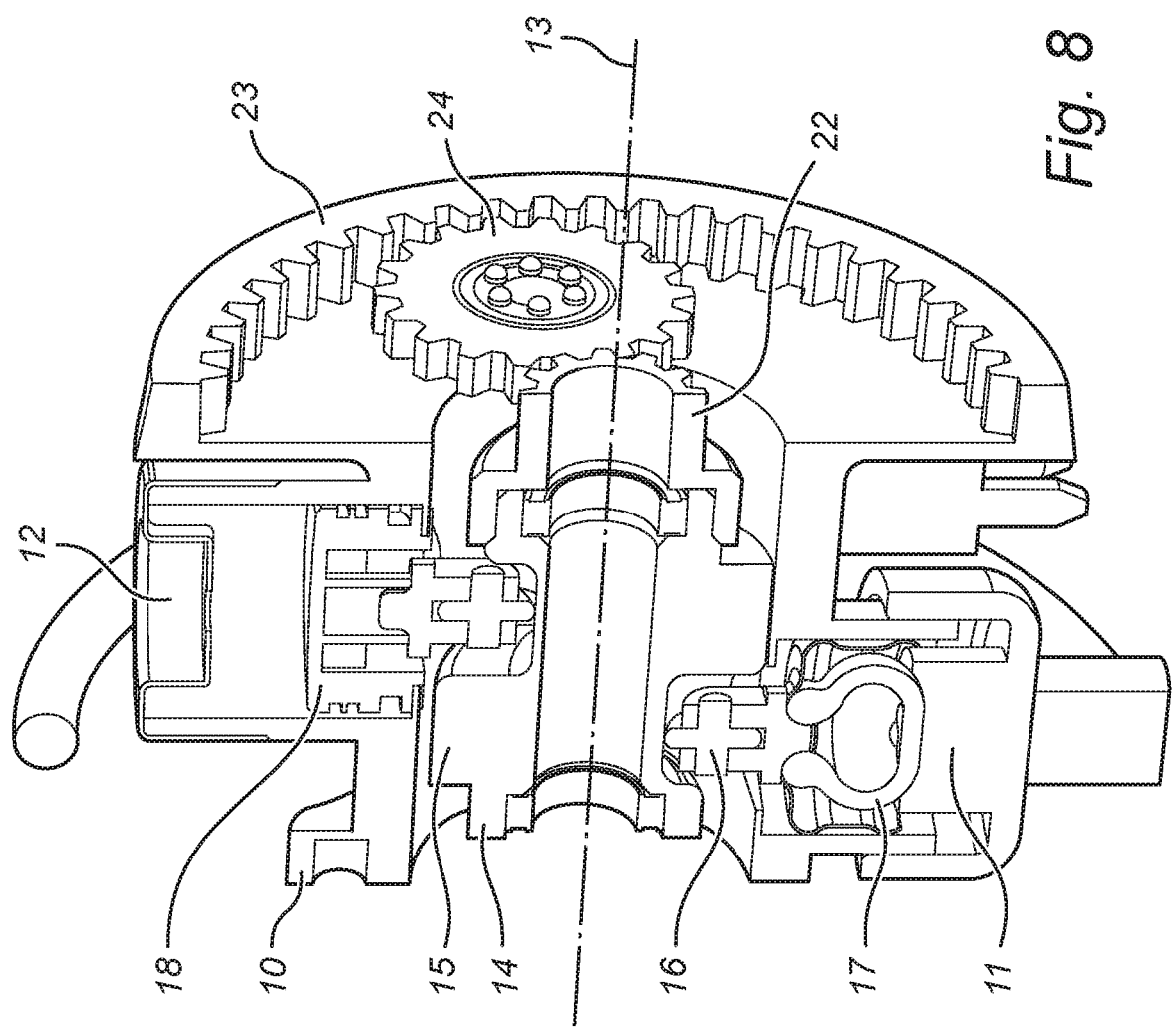
Figure 9:
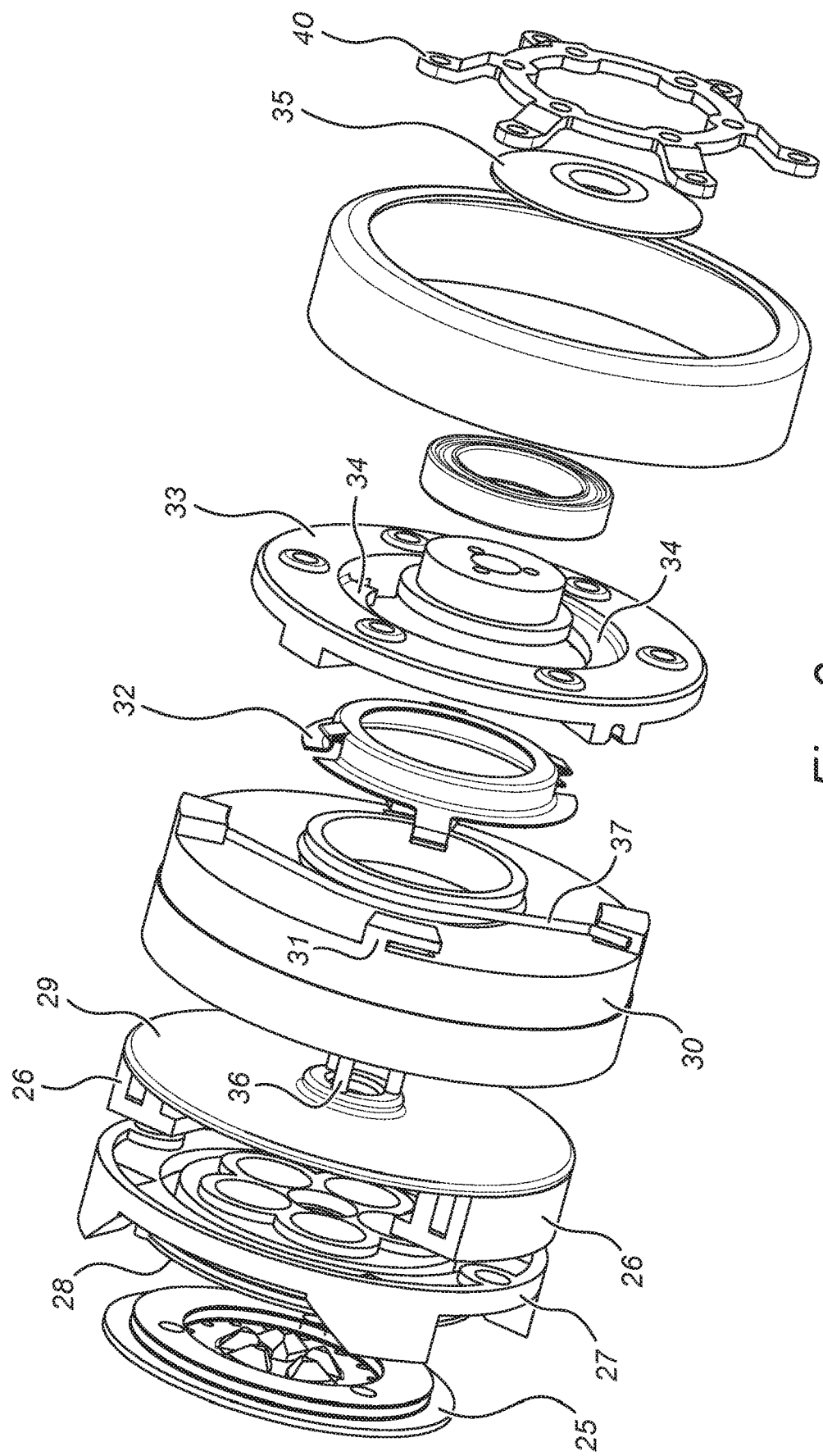
Figure 10:
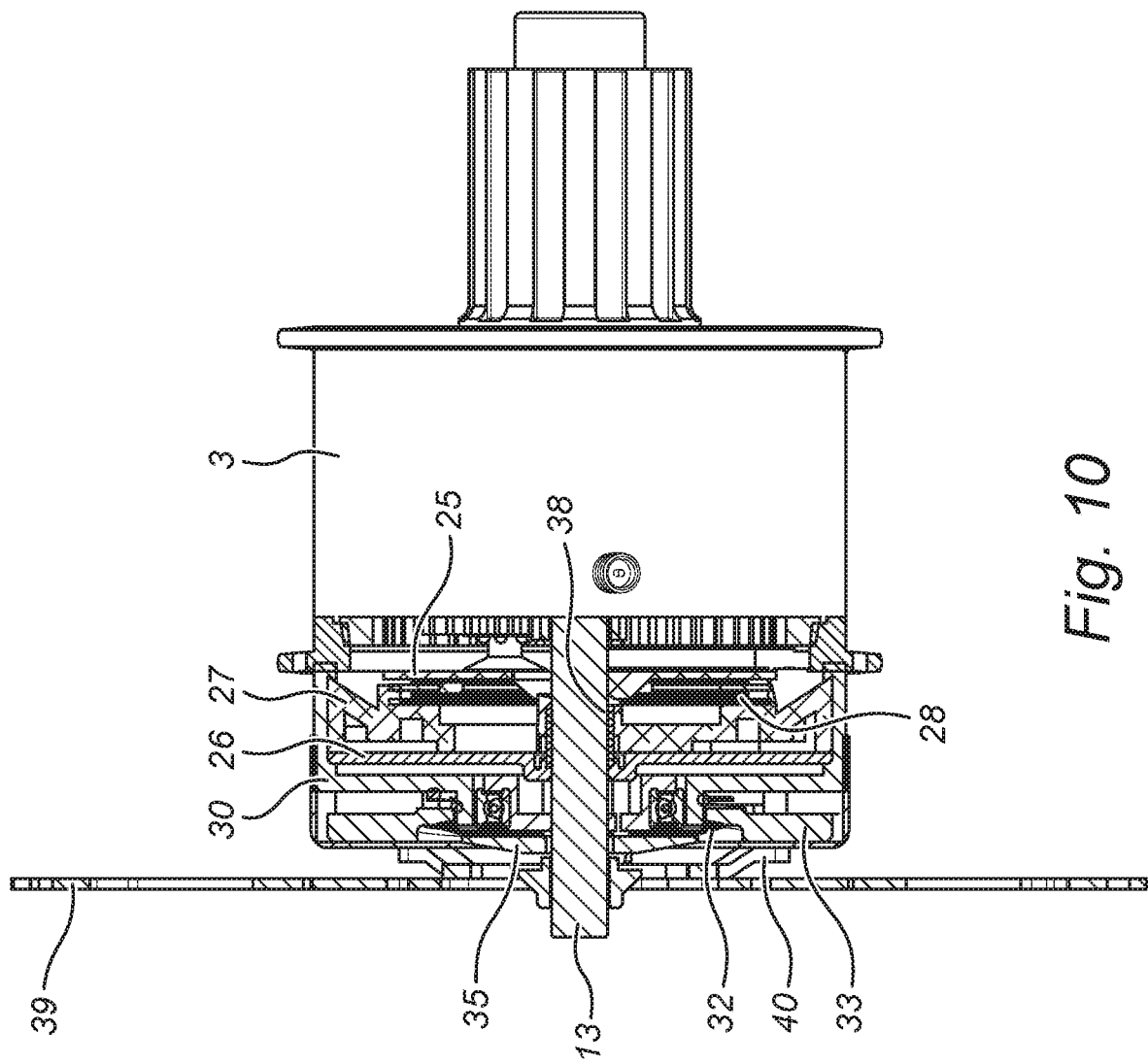
Figure 11:
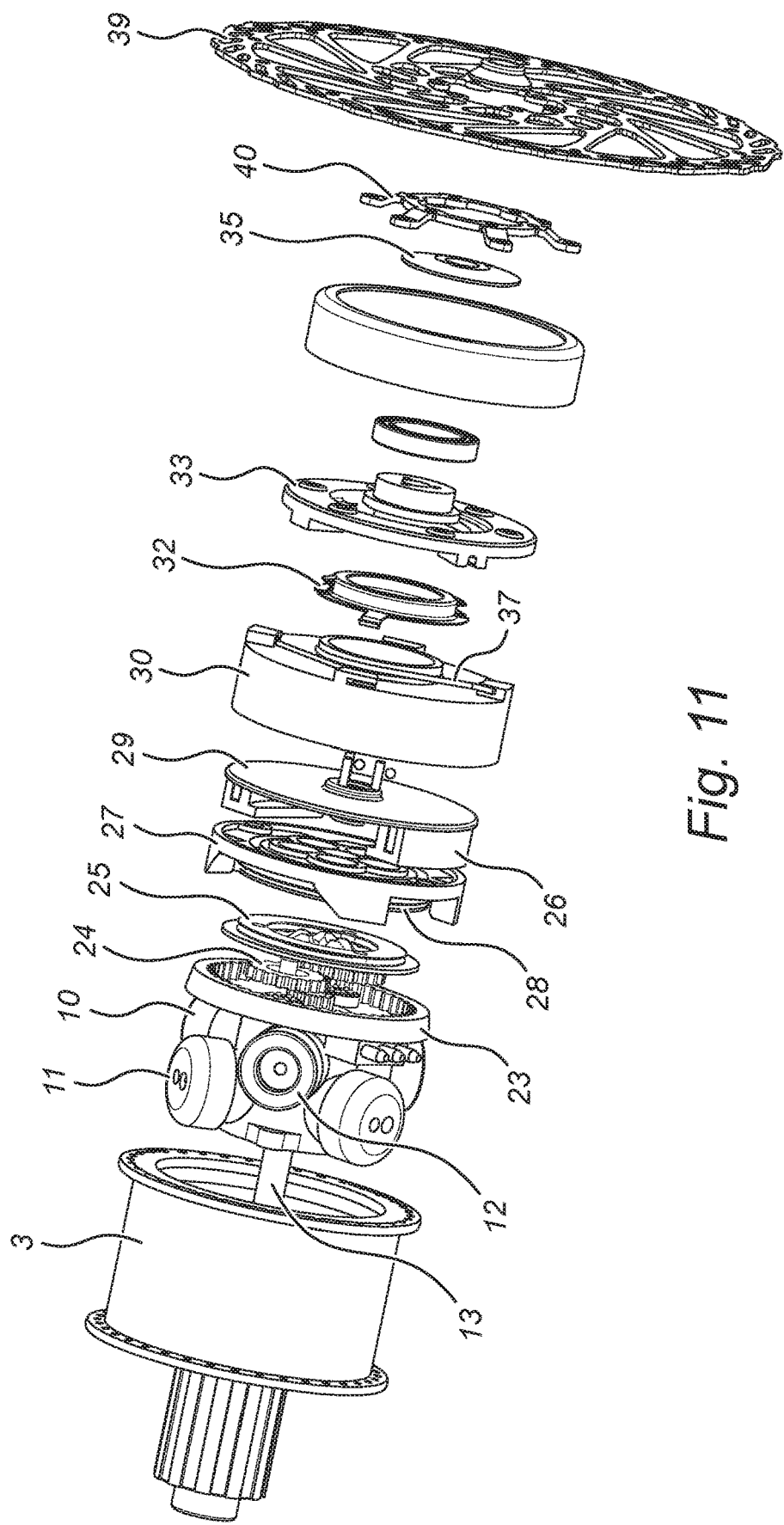
Figure 12A:
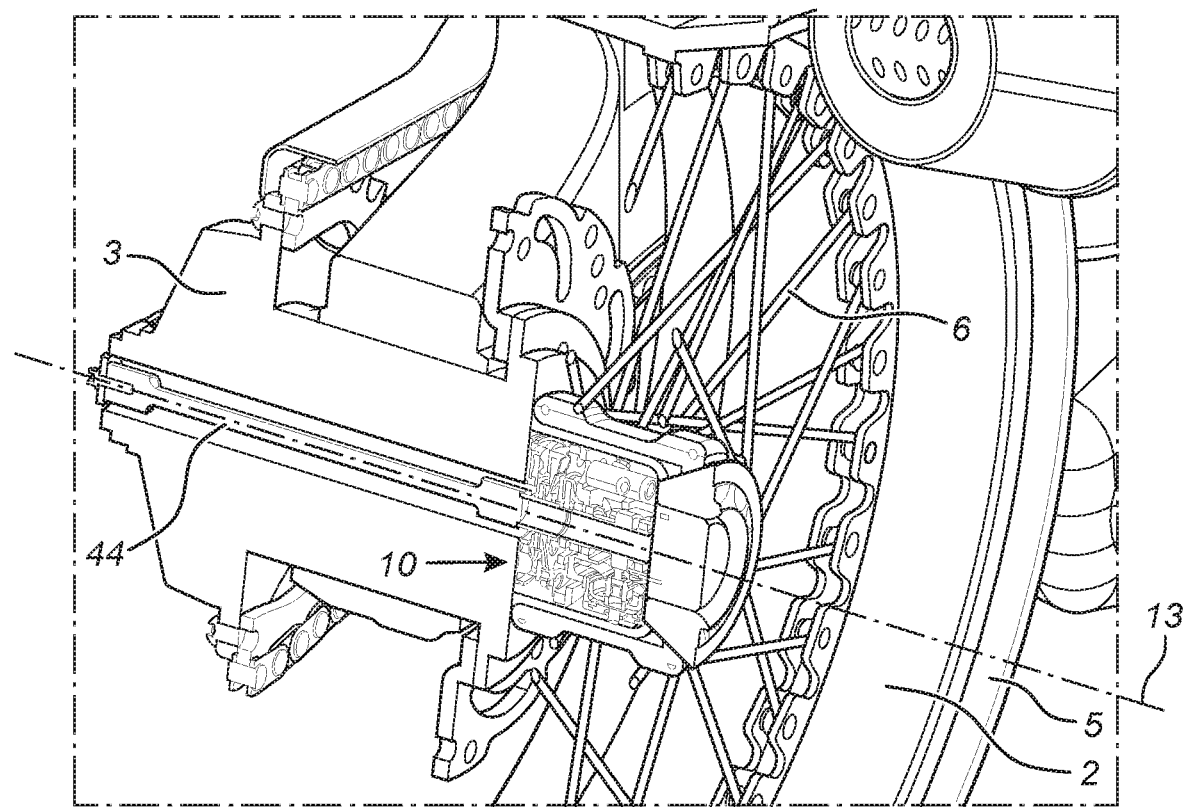
Figure 12B:
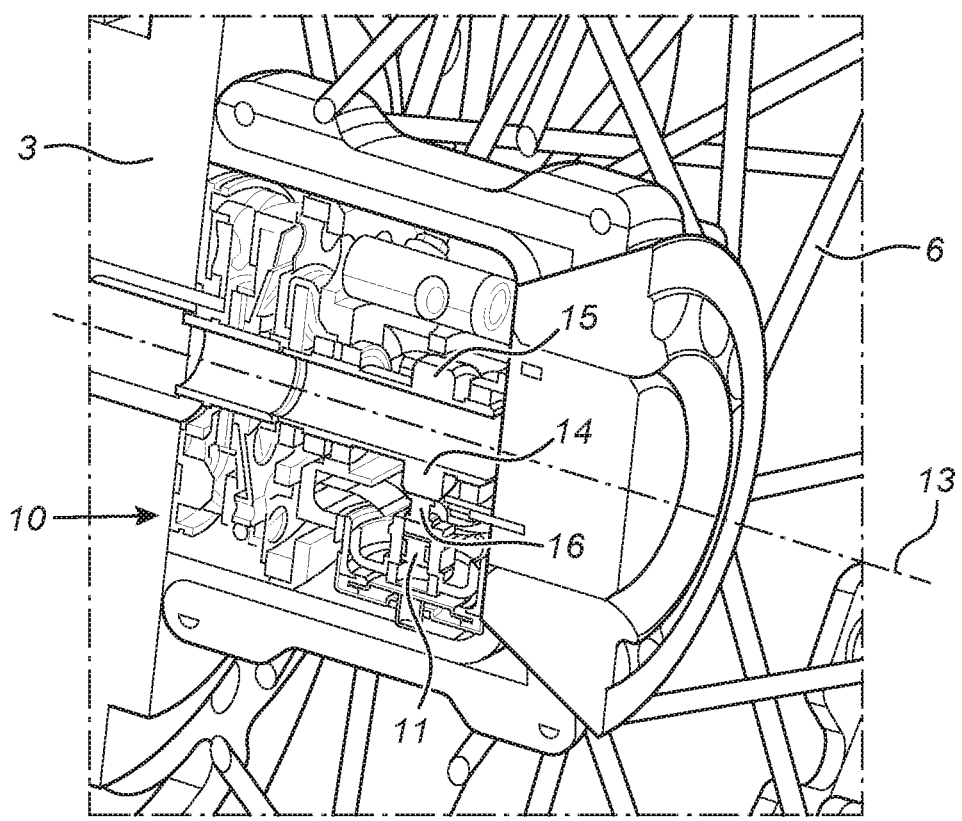
Figure 13:
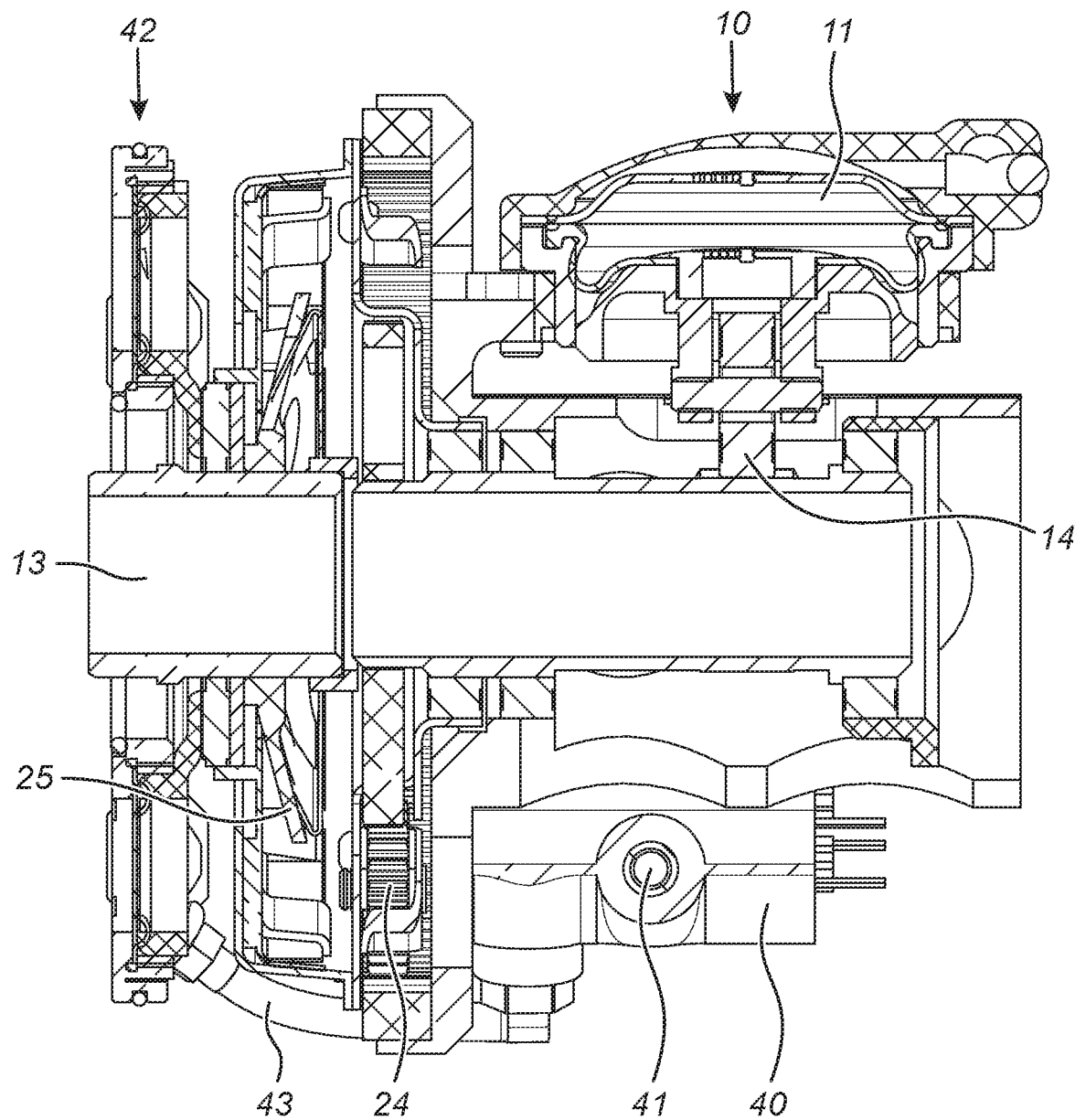
Figure 14:
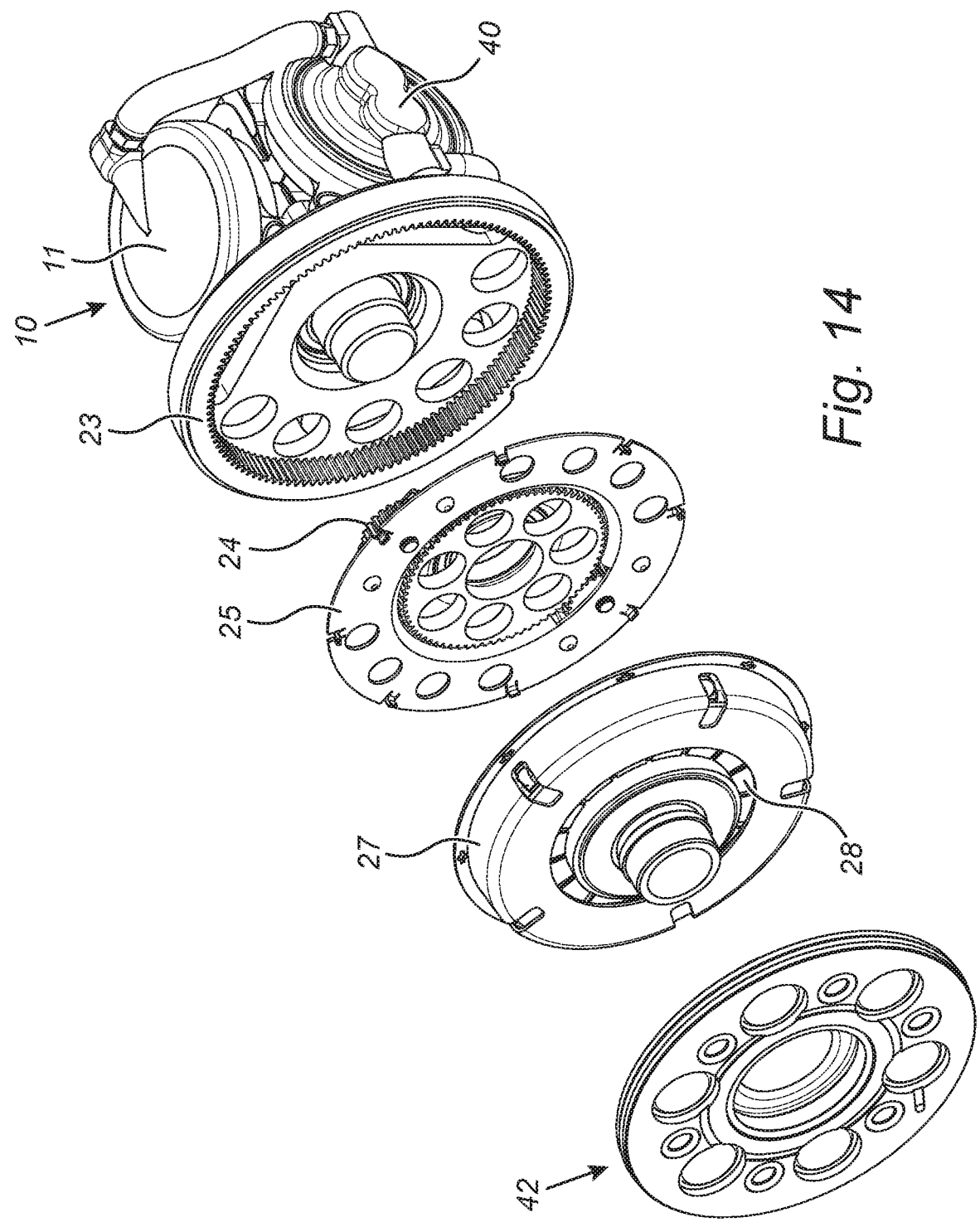

Fig, 2A shows a first enlarged sectional view of the tire wall shown in FIG. 2;

FIG. 2B shows a second enlarged sectional view of the tire wall shown in Fig. 2;

FIG. 3 diagrammatically shows a wheel according to the present invention with coaxial connections;

FIG. 3A shows an enlarged sectional view of the tire wall shown in FIG. 3;

FIG. 4 diagrammatically shows an exploded view of a compressor in a hub according to the present invention;

FIG. 5 diagrammatically shows a cross section along line I-I from FIG. 4;

FIG. 6 diagrammatically shows two exploded views, 6A and 6B, of the compressor according to FIGS. 4 and 5;

FIG. 7 diagrammatically shows a clutch for switching on a compressor according to the present invention;

FIG. 8 shows a diagrammatic view of the compressor with planetary wheel drive;

FIG. 9 diagrammatically shows a clutch for switching on a compressor according to the present invention;

FIG. 10 diagrammatically shows the exploded view from FIG. 9 in the non-exploded state;

FIG. 11 diagrammatically shows an exploded view of a hub according to the present invention;

FIGS. 12A and 12B diagrammatically show a wheel according to the invention on a motorized vehicle with a monolink;

FIG. 13 diagrammatically shows a variation on a hub according to the invention; and FIG. 14 diagrammatically shows the hub of FIG. 13 in exploded view with a variation on the clutch mechanism and a pneumatic drive compressed by the compressor itself.

DETAILED DESCRIPTION

Figure 1:
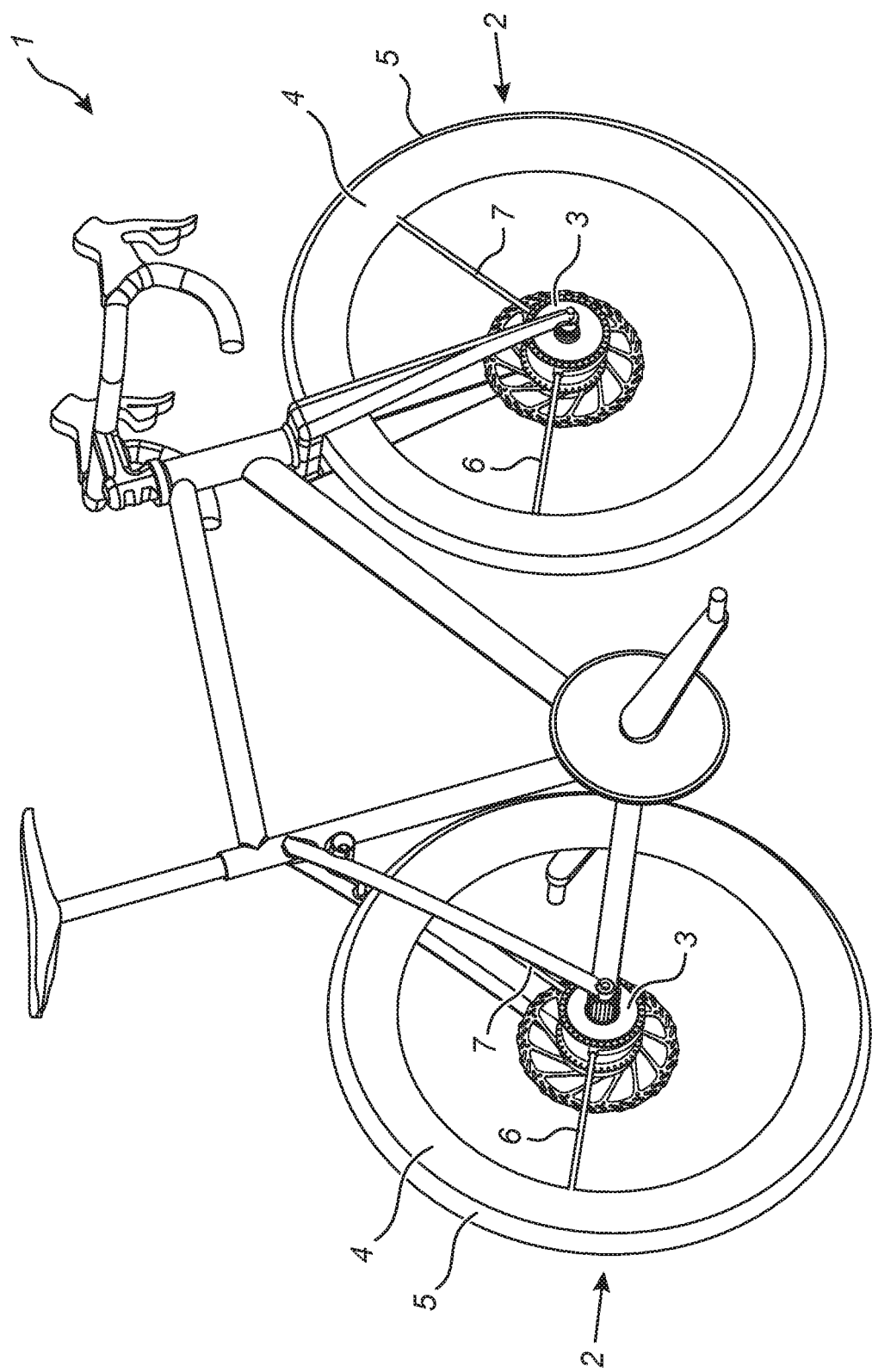
FIG. 1 diagrammatically shows a bicycle according to the present invention.

FIG. 1 diagrammatically shows a bicycle (1) as an example of a vehicle (1) according to the invention. The bicycle (1) is provided with two wheels (2), each comprising a hub (3), a rim (4) and a tyre (5). Each hub (3) is connected to the corresponding wheel (2) by means of two connections, a first connection (6) and a second connection (7). The connection may also be, for example, coaxial, as shown, for example, in FIG. 3. It is also possible to connect the hub with the tyre using a single connection.

FIG. 2 diagrammatically shows a wheel (2) according to the present invention with two enlargements, 2A and 2B, of the tyre wall. The wheel (2) comprises a hub (3), a rim (4) and a tyre (5). The hub (3) is connected to the tyre (5) by a first connection (6) and connected to an air reservoir (8)

inside the rim (4) by a second connection (7). This reservoir (8) can store compressed air and this reservoir (8) is arranged, for example, substantially around the entire rim, so that all empty space in the rim can be used to store air. By means of the second connection (7), this air may, for example, be returned again to the hub (3) and be supplied to the tyre (5) via the first connection (6) so as to be able to inflate this tyre (5). The connection may also be, for example, coaxial, as shown, for example, in FIG. 3. The reservoir may also be omitted, wherein the compressor is (directly) connected with the tyre.

FIG. 3 diagrammatically shows a wheel as shown in FIG. 2, in which the connections are arranged coaxially. FIG. 3 diagrammatically shows a wheel (2) according to the present invention with one enlargement, 3A, of the tyre wall. The wheel (2) comprises a hub (3), a rim (4) and a tyre (5). The hub (3) is connected to the tyre (5) by a first connection (6) and connected to an air reservoir (8) inside the rim (4) by a second connection (7). This reservoir (8) can store compressed air and this reservoir (8) is arranged, for example, substantially around the entire rim, so that all empty space in the rim can be used to store air. By means of the second connection (7), this air may, for example, be returned again to the hub (3) and be supplied to the tyre (5) via the first connection (6) so as to be able to inflate this tyre (5). In the illustrated connection, the first connection (6) is the inner side of the coaxial system and the outer wall forms the second connection (7). The second connection (7) is connected to the reservoir (8), for example by means of openings (0). The reservoir may also be omitted, wherein the compressor is directly connected with the tyre, and wherein only one connection is needed between the compressor and the tyre, and no connection is needed between tyre and reservoir.

FIG. 4 diagrammatically shows an exploded view of the compressor (10) in a hub (3) according to the present invention. The compressor (10) comprises six pump elements which are arranged in groups of three in two shells, a first group of three pump elements (11) and a second group of three pump elements (12). The compressor (10) is rotatable about a rotation axle (13), with a camshaft (14) converting this rotating movement in a translational, reciprocating movement inside the pump elements (11, 12). By means of the first (6) and second connections (7), compressed air can be passed either to an air reservoir (8) or a tyre (5) of the wheel (2). The connection may also be, for example, coaxial, as shown, for example, in FIG. 3. In this case, the camshaft (14) acts as the drive for the compressor (10). The empty space (R) in the hub (3) serves, for example, as an internal store (R) of the hub. In a first step, compressed outside air is stored, for example, in this empty space (R) before it is brought to a higher pressure in a second step. The store (R) may also be formed of connective tubing, connecting the group of pump elements (11, 12), or pump stages.

FIG. 5 diagrammatically shows a cross section along line I-I from FIG. 4. In the cross section, the compressor (10) is shown, which is rotatable about a stationary rotation axle (13). A camshaft (14) is also provided around the rotation axle (13). This camshaft (14) comprises several cams (15) which engage with cam followers (16) of the pump elements (11, 12). Upon rotation of the camshaft (14) and the compressor (10) with respect to each other, the cams (15) alternately cause various cam followers (16) to reciprocate in order thus to convert the mutual rotation into a translational, reciprocating movement. The first pump elements (11) are provided with bellows (17) and the second pump elements (12) are provided with pistons (18), although it is of course also possible to use other elements for this purpose. The supply and discharge of air to and from the pump elements (11, 12) can be controlled by means of conventional non-return valves. In an embodiment, outside air is for example compressed in the second pump elements (12) and stored in an empty space (R) of the hub (3) on account of a rotation of the camshaft (14) and compressor (10) with respect to each other and the resulting translational movement of the cam followers (16). This compressed air is then supplied to the first pump elements (11), where the air is compressed further. The outside air is supplied, for example, via the space (A) around the rotation axle (13) and camshaft (14).

FIG. 6 diagrammatically shows two exploded views, 6A and 6B, of the compressor (10) according to FIGS. 4 and 5. In the illustrated view, valves (19) are provided for the pump elements (11, 12), in which an inlet (20) and an outlet opening (21) are provided for supplying air and discharging (more) compressed air. The openings (20, 21) may be provided, for example, with non-return valves. FIG. 6A shows a representation which illustrates the camshaft (14) with cams (15) and the cam followers (16) of the pump elements (11, 12). FIG. 6B shows an illustration from the other side, in which the drive of the compressor (10) can be seen. The drive (22) as illustrated in FIG. 6B is of the planetary wheel type. The compressor (10) is provided with a satellite wheel (23) and the drive (22) acts as a central axle with carrier (22). The satellite wheel (23) and the drive (22) are coupled to each other by means of two planet wheels (24) and the drive (22) is connected to the camshaft (14).

Depending on the mutual fixation of the various elements of such a planet wheel mechanism, various functions could be fulfilled. If none of the parts of the clutch for example are fixed, all elements rotate together at the same angular speed. This means that there is no difference between the drive (22) and the satellite wheel (23) with respect to each other and thus no difference in rotation between the compressor (10) and the camshaft (14) with respect to each other and thus the compressor (10) is not driven. If the carrier of the planet wheels (24) is fixed with respect to the other elements in such a way that the wheels (24) no longer rotate together with the satellite wheel (23), then the satellite wheel (23) and the carrier (22) rotate in opposite directions. This results in a(-n opposite) rotation of camshaft (14) and compressor (10) with respect to each other and thus the compressor (10) is driven.

FIG. 7 diagrammatically shows a clutch for switching on a compressor according to the present invention. FIG. 7 diagrammatically shows the planet wheels (24) of FIG. 5B. These planet wheels (24) are arranged on a clutch plate (25). This clutch plate rotates (25) in a disengaged position at the same rotary speed as the compressor (10) and the rest of the hub (3). In the engaged position, the clutch plate (25) can be fixed by means of two stationary claws (26) in such a way that the clutch plate (25) touches the claws (26) and no longer rotates with the compressor (10) and the rest of the hub (3). The claws are connected, for example, to the stationary rotation axle (13) which does not rotate with the hub (3) either. However, the planet wheels (24) are provided in the clutch plate (25) so as to be rotatable. As the planet wheels (24) no longer rotate together with the satellite wheel (23) of the compressor (10), the planet wheels (24) will rotate with respect to the satellite wheel (23) and pass this rotation onto the drive (22) of the compressor. Slowing down rotating discs by means of claws (26) is effected, for example, in a known way, as is commonly used with disc brakes.

FIG. 8 shows a diagrammatic view of the compressor (10) comprising satellite wheel (23), planet wheel (24) and drive (22) of the compressor (10). When the satellite wheel (23) rotates with the hub (3) and the planet wheel (24) cannot rotate because it is fixed, then the planet wheel (24) will rotate with respect to the compressor (10) and pass this rotation onto the drive (22), thus causing a rotation of the camshaft (14) connected to the drive (22). This rotation is converted into a pumping movement of the pump elements (11, 12) by means of the cams (15) and cam followers (16).

FIG. 9 diagrammatically shows a way of switching on or coupling the compressor (10). FIG. 9 shows an exploded view of the clutch plate (25), in which the planet wheels (24) are provided, for example according to FIG. 6, 7 or 8. In addition, a claw holder (27) provided with friction plates (28) is shown. Next, a chuck (29) with claws (26) is shown. The clutch plate (25) rotates together with the hub in a disengaged position, the claw holder (27) and the chuck (29) are stationary.

In a coupled position, the clutch plate (25) is moved against the friction plates (28) and the clutch plate (25) slows down until it is stationary, together with the friction plates (28) and the claw holder (27). Next to the chuck (29), a base plate (30) is provided which forms part of the housing of the hub (3). A fastening plate (33) runs against the base plate (30) for the disc brake (39) (via adapter disc (40)). This plate (33) can rotate freely at an angle with respect to the base plate (30). Rotation takes place if the disc brake (39) is actuated while travelling or cycling. If the brake is released, the plate (30) will return to its initial position due to a rotation spring (37). The rotation is limited by cams (31) of the base plate (30). The plate (33) is provided with a follower profile (34). This follower profile ensures that the profile follower disc (32) can move axially, due to the relative rotation of the plate (33) with respect to the base plate (30). The profile follower disc (32) itself is not able to rotate with respect to the base plate (30), but is attached to the base plate (30) so as be resilient in an axial direction. Upon axial displacement of the profile follower disc (32), this disc comes into contact with the actuator disc (35), as a result of which this disc will also be able to move axially. This disc is connected to the chuck (29) by means of a number of rods (36). A rotation of the attachment plate (33) thus causes an axial displacement of the actuator disc (35) and chuck (29) towards the outside (away from the clutch plate (25)) and eventually causes a coupling between clutch plate (25) and friction plate (28).

The base plate (30) is provided with a compression spring (38) which ensures that, during disengagement, the chuck (29) is disengaged from the clutch plate (25). As a result thereof, the actuator disc (35) will also be able to move axially again in an inward direction. During disengagement, the profile follower disc (32) will also move axially in an inward direction. This displacement is greater than the axial displacement of the actuator disc (35), as a result of which the rotating hub housing no longer contacts the static actuator disc (35) after disengagement, as a result of which no wear and loss of power occurs.

FIG. 10 shows the exploded view of FIG. 9 in an engaged position, which also shows a disc brake (39).

FIG. 11 shows an exploded view of a complete hub (3) according to the invention.

Although many of the figures show the application of bicycle wheels and hubs, the present invention is not limited to the use in bicycles. It is envisioned that the invention is applicable to all sorts of vehicles, including bicycles, motors, scooters, mopeds and even automobiles.

FIG. 12 schematically shows the application of the invention in a motorized vehicle. FIG. 12A shows a schematic view, wherein FIG. 12B shows a detailed view of the hub part of FIG. 12A. Corresponding features with regard to the earlier shown elements have been provided with the same reference numerals. In motorized vehicles, as opposed to for instance bicycles or muscle driven vehicles, a more continuous pumping action can take place, for instance at a lower speed. To this end, outside air may be provided to the compressor (10), which compressor (10) is driven upon rotation of the wheel (2). The compressed air is fed to the tyre (5) by a first connection (6). The motorized vehicle may for instance always use a pressure monitoring system, which monitors the pressure inside the tyre (5), and automatically engage the compressor if the pressure drops below a threshold value. Such system has the benefit that at all times the tyre pressure are within the prescribed range, allowing for a smooth and economic ride. In the shown embodiment, the compressor (10) is located on a side of the hub (3), and the centre of the hub is provided with a stator shaft (44). Such stator shaft (44) is used because the shown motorized vehicle is provided with a so-called Monolink (so single) rear axle casing. It is envisioned that the specific configuration of the elements depends on the actual wheels used, wherein all sorts of variations are considered to fall within the scope of protection.

FIG. 13 schematically shows a variation on a hub mounted system according to the invention. FIG. 13 shows a compressor suitable for integrating in a hub of a vehicle wheel. At the right of the figure, a compressor (10) is shown for compressing outside air by means of a membrane (11). The membrane (11) compresses the air due to a pumping action of a cam shaft (14). The compressed air is supplied to a pressure control unit (40) via a (non-shown) duct. The pressure control unit (40) may feed compressed air to a (non-shown) tyre via an connection outlet (41).

Towards the left a planetary gear set is present, similar to the set as shown in FIGS. 8 and 11. Further towards the left a clutch group is present, also as depicted before. At the left, an actuating group (42) is shown, which is provided with compressed air from the pressure control unit (40) via an air duct (43). This way, the actuator can selectively move from the left to the right, and selectively engage or disengage the clutch mechanism. This enable the clutch to be operated with air pressure, instead of with braking force or external actuators.

The invention claimed is:
1. A wheel, comprising:
 a hub, a rim, and an inflatable tyre in which the hub is situated around a rotation axle of the wheel and the hub rotates about the stationary rotation axle upon rotation of the wheel;
 a compressor disposed substantially inside the hub, the compressor comprising at least two pistons for compressing air;
 a drive for driving the compressor, wherein the drive is rotatable with respect to the rotation axle in a direction opposite to that of the hub; and
 a first connection for connecting an outlet of the compressor to the inflatable tyre of the wheel;
 wherein the compressor is configured for compressing outside air, the compressor having an inlet for taking in air at atmospheric pressure and the outlet for delivering air at an increased pressure, and wherein the hub is provided with an air intake for supplying air to the inlet of the compressor; and wherein the compressor is configured to compress air in at least two separate steps, the compressor configured to compress air to a first increased pressure in a first step and to compress the compressed air further in a subsequent second step to a second increased pressure, and wherein the compressor comprises a store for storing air compressed in the first step at the first increased pressure.

2. The wheel according to claim 1, further comprising an air reservoir for storing the air at increased pressure, the air reservoir positioned inside the rim of the wheel, wherein the first connection is configured for connecting the outlet of the compressor to the air reservoir or the inflatable tyre of the wheel, and comprising a second connection for connecting the air reservoir and the inflatable tyre of the wheel.

3. The wheel according to claim 2, comprising a controller for controlling the air supply and connecting the first connection to either the air reservoir or the inflatable tyre, the controller comprising a two-way valve or a three-way valve.

4. The wheel according to claim 2, in which the first connection and/or the second connection comprises a hollow spoke and/or in which the first connection and the second connection are arranged coaxially.

5. The wheel according to claim 1, wherein the first increased pressure is up to 6 bar and the second increased pressure is up to 18 bar, and wherein the store is positioned inside the hub.

6. The wheel according to claim 1, wherein the compressor is connected to the hub in a fixed and/or non-rotating manner.

7. The wheel according to claim 1, wherein each of the at least two pistons includes a non-return valve that allows air to be supplied while preventing compressed air from leaking.

8. The wheel according to claim 1, wherein the drive comprises a camshaft rotatable about the rotation axle for converting the rotation of the drive into a reciprocating or pumping movement at right angles to the rotation axle or in a radial direction.

9. The wheel according to claim 1, wherein the compressor and the drive include teeth which are connected by a planetary gear clutch, in which the teeth of the planetary gear clutch and the teeth of the compressor have a ratio greater than 1.

10. The wheel according to claim 9, wherein the drive of the compressor, when in a disengaged position, is rotatable about the stationary rotation axle together with the hub at substantially a same angular speed, with the drive of the compressor rotating with respect to the hub in an engaged position in the opposite direction.

11. The wheel according to claim 10, wherein the hub comprises a clutch disc, which when in the disengaged position, rotates about the rotation axle together with the hub, and the clutch disc, when in the engaged position, is connected to the rotation axle.

12. The wheel according to claim 11, in which the planetary gear clutch is rotatably positioned on the clutch disc.

13. The wheel according to claim 11, comprising a clutch mechanism for changing the position of the clutch disc in reaction to an external signal including a braking action or an actuating signal from an actuating unit.

14. A hub for use in the wheel according to claim 1.

15. A bicycle including at least one wheel according to claim 1.

16. A compressor for incorporating in a hub or in a wheel according to claim 1.

* * * * *